# United States Patent
Liu et al.

(10) Patent No.: US 10,216,038 B2
(45) Date of Patent: Feb. 26, 2019

(54) BACKPLATE, SUPPORT FRAME FOR BACKLIGHT UNIT, BACKLIGHT UNIT AND DISPLAY DEVICE

(71) Applicants: BOE TECHNOLOGY GROUP CO., LTD., Beijing (CN); HEFEI BOE DISPLAY LIGHT CO., LTD., Hefei, Anhui (CN)

(72) Inventors: Tongmin Liu, Beijing (CN); Qiping Zhang, Beijing (CN); Wenbo Sun, Beijing (CN); Pei Du, Beijing (CN); Sheng Zhang, Beijing (CN); Yanfeng Li, Beijing (CN); Jitai Xia, Beijing (CN); Xing Wang, Beijing (CN)

(73) Assignees: BOE TECHNOLOGY GROUP CO., LTD., Beijing (CN); HEFEI BOE DISPLAY LIGHT CO., LTD., Hefei, Anhui (CN)

( * ) Notice: Subject to any disclaimer, the term of this patent is extended or adjusted under 35 U.S.C. 154(b) by 201 days.

(21) Appl. No.: 14/913,094

(22) PCT Filed: Jul. 15, 2015

(86) PCT No.: PCT/CN2015/084084
§ 371 (c)(1),
(2) Date: Feb. 19, 2016

(87) PCT Pub. No.: WO2016/169138
PCT Pub. Date: Oct. 27, 2016

(65) Prior Publication Data
US 2017/0059137 A1    Mar. 2, 2017

(30) Foreign Application Priority Data
Apr. 23, 2015    (CN) .......................... 2015 1 0198534

(51) Int. Cl.
*G02F 1/1333* (2006.01)
*G02F 1/1335* (2006.01)
(Continued)

(52) U.S. Cl.
CPC .... *G02F 1/133608* (2013.01); *B29C 45/1418* (2013.01); *B29C 45/14344* (2013.01);
(Continued)

(58) Field of Classification Search
USPC .......................................... 428/597
See application file for complete search history.

(56) References Cited

U.S. PATENT DOCUMENTS 1,502,873 A * 7/1924 Oberg ............... G02F 1/133608
29/896.6
2,688,581 A * 9/1954 George .................... B26D 1/00
156/231
(Continued)

FOREIGN PATENT DOCUMENTS

BE          656357 A * 3/1965  ............. A47G 19/22
CN        1758097 A *  4/2006
(Continued)

OTHER PUBLICATIONS

Machine Translation of JP 08-274483 A, Oct. 1996 (Year: 1996).*
(Continued)

*Primary Examiner* — Jeffrey A Vonch
(74) *Attorney, Agent, or Firm* — Womble Bond Dickinson (US) LLP (57) ABSTRACT

The present invention relates to the display technology field, and provides a backplate, a plastic-iron integrated structure, a backlight unit, and a display device. The backplate is provided with a first through hole, and the first through hole has an inner wall and an outer wall which form a projection structure on the backplate. When the backplate is bonded (Continued)

with a plastic frame to form the plastic-iron integrated structure, the plastic frame not only contacts the inner wall of the first through hole, but also contacts the surface of the projection structure, thus increasing the contact area between the plastic frame and the backplate, and increasing the bonding force between the plastic frame and the backplate. Even when the plastic frame shrinks in case of fluctuations in temperature and/or humidity, the plastic frame is not easily separated from the backplate, and the stability of the formed plastic-iron integrated structure is improved.

9 Claims, 6 Drawing Sheets (51) Int. Cl.
  *B29C 45/14* (2006.01)
  *B29C 70/74* (2006.01)
  *B29K 101/00* (2006.01)
  *H04M 1/02* (2006.01)
  *B29L 31/34* (2006.01)
  *B21D 11/00* (2006.01)
  *B29K 705/12* (2006.01)
  *B29K 21/00* (2006.01)
  *B21D 35/00* (2006.01)
  *B32B 3/26* (2006.01)
  *B32B 1/02* (2006.01)
  *B32B 15/06* (2006.01)
  *B32B 15/08* (2006.01)

(52) U.S. Cl.
  CPC ...... *B29C 45/14409* (2013.01); *B29C 70/745* (2013.01); *G02F 1/133308* (2013.01); *B21D 11/00* (2013.01); *B21D 35/001* (2013.01); *B21D 35/002* (2013.01); *B29C 2045/14327* (2013.01); *B29C 2045/14368* (2013.01); *B29K 2021/00* (2013.01); *B29K 2101/00* (2013.01); *B29K 2705/12* (2013.01); *B29K 2821/00* (2013.01); *B29L 2031/3475* (2013.01); *B29L 2031/3481* (2013.01); *B32B 1/02* (2013.01); *B32B 3/266* (2013.01); *B32B 15/06* (2013.01); *B32B 15/08* (2013.01); *B32B 2311/30* (2013.01); *B32B 2319/00* (2013.01); *B32B 2398/00* (2013.01); *B32B 2457/00* (2013.01); *B32B 2457/20* (2013.01); *G02F 2001/133314* (2013.01); *H04M 1/0266* (2013.01); *Y10T 428/1355* (2015.01); *Y10T 428/2419* (2015.01); *Y10T 428/24174* (2015.01); *Y10T 428/24281* (2015.01); *Y10T 428/24289* (2015.01); *Y10T 428/24322* (2015.01); *Y10T 428/24331* (2015.01); *Y10T 428/24339* (2015.01); *Y10T 428/24347* (2015.01); *Y10T 428/24777* (2015.01)

(56) References Cited

U.S. PATENT DOCUMENTS

| | | | | |
|---|---|---|---|---|
| 5,190,803 A * | 3/1993 | Goldbach | ........... | B29C 37/0085 264/261 |
| 5,527,625 A * | 6/1996 | Bodnar | ................ | E04C 3/065 428/595 |
| 6,018,190 A * | 1/2000 | Wang | ................ | H05K 5/0269 257/679 |
| 6,183,841 B1 * | 2/2001 | Hanrahan | ............ | G11B 5/4813 29/507 |
| 2005/0280750 A1 * | 12/2005 | Cho | ................ | G02F 1/133308 349/58 |
| 2007/0064448 A1 * | 3/2007 | Yu | ........................ | G02B 6/0065 362/633 |
| 2007/0200969 A1 | 8/2007 | Hsu et al. | | |
| 2007/0216826 A1 * | 9/2007 | Lee | ................ | G02F 1/133308 349/58 |
| 2008/0160253 A1 * | 7/2008 | Liu | ................ | B29C 45/14344 428/138 |
| 2008/0273138 A1 * | 11/2008 | Lee | ................ | B29C 45/14344 349/58 |
| 2008/0278895 A1 * | 11/2008 | Woo | ................ | G02F 1/133308 361/679.02 |
| 2009/0004408 A1 * | 1/2009 | Nakanishi | ......... | G02F 1/133308 428/12 |
| 2009/0122217 A1 * | 5/2009 | Chen | ................ | G02F 1/133308 349/58 |
| 2009/0219724 A1 * | 9/2009 | Wang | ................ | G02F 1/133308 362/362 |
| 2009/0303408 A1 * | 12/2009 | Huang | .............. | G02F 1/133308 349/58 |
| 2010/0135039 A1 * | 6/2010 | Li | ........................ | G02B 6/0055 362/607 |
| 2010/0215938 A1 * | 8/2010 | Wang | ................ | B29C 45/14311 428/223 |
| 2010/0255732 A1 * | 10/2010 | Kohmura | .............. | B29C 45/006 439/733.1 |
| 2011/0116220 A1 * | 5/2011 | Lee | ................ | G02F 1/133308 361/679.02 |
| 2011/0216489 A1 * | 9/2011 | Lim | ........................ | H05K 7/00 361/679.01 |
| 2011/0287812 A1 * | 11/2011 | Joo | ........................ | H04M 1/185 455/566 |
| 2014/0362328 A1 * | 12/2014 | Kuroki | .............. | G02F 1/133308 349/58 |
| 2015/0022753 A1 * | 1/2015 | Akatsuka | ......... | G02F 1/133308 349/58 |
| 2016/0048059 A1 * | 2/2016 | Zhang | ................ | G02F 1/133608 349/61 |
| 2016/0207236 A1 * | 7/2016 | Tsubota | ............... | B21D 35/001 |

FOREIGN PATENT DOCUMENTS

| | | | |
|---|---|---|---|
| CN | 2842487 | 11/2006 | |
| CN | 1928655 | 3/2007 | |
| CN | 1928655 A | 3/2007 | |
| CN | 201163325 Y * | 12/2008 | |
| CN | 201174011 Y * | 12/2008 | |
| CN | 201182045 Y * | 1/2009 | ......... B29C 37/0085 |
| CN | 201207114 Y * | 3/2009 | |
| CN | 201210210 Y * | 3/2009 | |
| CN | 101396855 A * | 4/2009 | |
| CN | 101504119 A | 8/2009 | |
| CN | 101504119 A * | 8/2009 | |
| CN | 101532650 A * | 9/2009 | ............ A47G 19/22 |
| CN | 201584118 U * | 9/2010 | |
| CN | 201584118 U | 9/2010 | |
| CN | 102394952 A * | 3/2012 | ............ B32B 15/01 |
| CN | 102529093 A * | 7/2012 | |
| CN | 202371653 U * | 8/2012 | |
| CN | 202675085 U * | 1/2013 | |
| CN | 202884821 | 4/2013 | |
| CN | 202884821 U * | 4/2013 | |
| CN | 203010423 U * | 6/2013 | |
| CN | 203190228 U * | 9/2013 | |
| CN | 203217208 U * | 9/2013 | |
| CN | 203340199 U | 12/2013 | |
| CN | 203464055 U * | 3/2014 | |
| CN | 203549711 U * | 4/2014 | |
| CN | 104197241 | 12/2014 | |
| CN | 203980161 U * | 12/2014 | |
| CN | 204009290 | 12/2014 | |
| CN | 204009290 U * | 12/2014 | |
| CN | 204009290 U | 12/2014 | |
| CN | 204188917 U * | 3/2015 | |
| DE | 102005061280 B3 * | 4/2007 | ......... B29C 45/1418 |
| DE | 102009008659 A1 * | 8/2010 | ........... B62D 29/001 |

(56) References Cited

FOREIGN PATENT DOCUMENTS

| | | | | |
|---|---|---|---|---|
| EP | 0976519 A1 | * | 2/2000 | ....... B29C 45/14311 |
| EP | 2500162 A1 | * | 9/2012 | ........... B29C 65/028 |
| FR | 1433897 A | * | 4/1966 | ........ B29C 37/0085 |
| GB | 1599708 A | * | 10/1981 | ............. B23P 11/00 |
| GB | 1603168 A | * | 11/1981 | ........ B29C 37/0082 |
| JP | 08274483 A | * | 10/1996 | |
| JP | 10290088 A | * | 10/1998 | ....... B29C 45/14467 |
| JP | 11298158 A | * | 10/1999 | ....... B29C 45/14778 |
| JP | 2000223855 A | * | 8/2000 | |
| JP | 2003170531 A | * | 6/2003 | ........ B29C 45/1418 |
| JP | 2004240239 A | | 8/2004 | |
| JP | 2004240239 A | * | 8/2004 | |
| JP | 2005121929 A | * | 5/2005 | |
| JP | 2005346932 A | * | 12/2005 | |
| JP | 2009069334 A | * | 4/2009 | |
| JP | 2010000718 A | * | 1/2010 | |
| JP | 2010224291 A | * | 10/2010 | |
| JP | 2011023312 A | * | 2/2011 | |
| JP | 2011191600 A | * | 9/2011 | ....... G02F 1/133308 |
| KR | 20040097092 A | * | 11/2004 | |
| KR | 20050004577 A | * | 1/2005 | ........... B62D 29/001 |
| KR | 20070052082 A | * | 5/2007 | .............. B23P 11/00 |
| KR | 100732998 B1 | * | 6/2007 | |
| KR | 20080051344 A | * | 6/2008 | |
| KR | 20080089897 A | * | 10/2008 | |
| KR | 100889532 B1 | * | 3/2009 | |
| KR | 100961187 B1 | * | 6/2010 | |
| KR | 200467525 Y1 | * | 6/2013 | |
| TW | M343174 U | * | 10/2008 | |
| WO | WO-2007051652 A1 | * | 5/2007 | ......... B29C 45/1418 |
| WO | WO-2012033017 A1 | * | 3/2012 | ....... G02F 1/133308 |
| WO | WO-2012162909 A1 | * | 12/2012 | ............. B32B 15/01 |

OTHER PUBLICATIONS

Machine Translation of CN 204188917 U, Mar. 2015 (Year: 2015).*
Machine Translation of DE 102005061280 B3, Apr. 2007 (Year: 2007).*
Machine Translation of CN101532650A, Sep. 2009 (Year: 2009).*
Machine Translation of KR200467525Y, Jun. 2013 (Year: 2013).*
Machine Translation of EP 1945446 B1 (equivalent to WO 2007/051652 A1) (Year: 2015).*
Office Action in Chinese Application No. 201510198534.4 dated May 16, 2017, with English translation.
International Search Report and Written Opinion with English Language Translation, dated Jan. 12, 2016, Application No. PCT/CN2015/084084.
"Second office action," CN Application No. 201510198534.4 (dated Nov. 29, 2017).

* cited by examiner

BACKPLATE, SUPPORT FRAME FOR BACKLIGHT UNIT, BACKLIGHT UNIT AND DISPLAY DEVICE

FIELD OF THE INVENTION

The present invention relates to the display field, and particularly to a backplate, a plastic-iron integrated structure, a backlight unit, and a display device.

BACKGROUND OF THE INVENTION

A display apparatus primarily comprises a display panel and a backlight unit. The backlight unit comprises a plastic-iron integrated structure, a backlight source, a reflector plate, a light guide, or the like. The plastic-iron integrated structure is formed by integrating a backplate and a plastic frame, and can be used to support other structures in the backlight unit. The backplate and the plastic frame should be tightly coupled, so as to solidly support other structures. Once the backplate was separated from the plastic frame, flatness of other structures would be affected, and the display effect of the display apparatus would further be affected.

During forming the plastic-iron integrated structure, through holes are generally formed in the backplate. For example, through holes are arranged in a bottom face of the backplate, or at intersecting positions between the bottom face and a side face of the backplate. Then the molded backplate is placed in a molding chamber, and molten plastic material is injected into the backplate. The plastic material will fill through holes in the backplate. When the plastic material is cured at a reduced temperature to form the plastic frame, the backplate and the plastic frame are integrated to form the plastic-iron integrated structure.

During realization of the present invention, the inventor found that the prior art at least suffers from the following problems.

The plastic frame contacts the backplate only at an inner wall of the through holes, and the contact area is relatively small, resulting in a weak bonding force between the plastic frame and the backplate. The plastic material shrinks in case of fluctuations in temperature and/or humidity. Due to the weak bonding force between the plastic frame and the backplate, the plastic frame tends to separate from the backplate, so that the plastic-iron integrated structure has a poor stability.

SUMMARY OF THE INVENTION

To solve the above problems in the prior art, embodiments of the present invention provide a backplate, a plastic-iron integrated structure, a backlight unit, and a display device. The technical solutions are presented as follow.

In a first aspect, its is provided a backplate, comprising: a base plate; a projection structure on the base plate; and a first through hole penetrating the base plate and the projection structure.

For example, the projection structure projects from an outer surface of the base plate.

For example, the projection structure projects from the inner surface of the base plate.

For example, the projection structure comprises a bending structure which bends inwards in a radial direction of the first through hole; a second through hole is formed in the bending structure, the second through hole communicates with the first through hole, and the second through hole has an inner diameter smaller than that of the first through hole.

For example, the base plate comprises a bottom face and a side face intersecting the bottom face, and the first through hole is located in the side face of the base plate.

For example, at least a portion of the projection structure and the base plate are formed into an integral piece, or at least a portion of the projection structure is formed by the base plate.

In a second aspect, it is provided a plastic-iron integrated structure, comprising the backplate as described in the first aspect; and a plastic frame which is bonded with the backplate.

For example, the plastic frame contacts an inner surface of the first through hole and a top surface of the projection structure.

For example, the plastic frame contacts a surface of the projection structure.

For example, the plastic frame has a width of 0.65 mm-0.95 mm.

In a third aspect, it is provided a backlight unit, comprising the plastic-iron integrated structure as described in the second aspect.

In a fourth aspect, it is provided a display device, comprising the backlight unit as described in the third aspect.

The technical solutions according to embodiments of the present invention have the following beneficial effects.

Embodiments of the present invention provide a backplate, a plastic-iron integrated structure, a backlight unit, and a display device. A projection structure is formed on a base plate, and the first through hole penetrates the base plate and the projection structure. When the backplate is bonded with a plastic frame to form the plastic-iron integrated structure, the plastic frame not only contacts the inner wall of the first through hole, but also contacts the surface of the projection structure, thus increasing the contact area between the plastic frame and the backplate, and increasing the bonding force between the plastic frame and the backplate. Even when the plastic frame shrinks in case of fluctuations in temperature and/or humidity, the plastic frame is not easily separated from the backplate, and the stability of the formed plastic-iron integrated structure is improved.

BRIEF DESCRIPTION OF THE DRAWINGS

The accompanying drawings for describing embodiments of the present invention will be briefly described hereinafter, for purpose of illustrating technical solutions in these embodiments. Apparently, the drawings described below are merely some embodiments of the present invention. A person of ordinary skill in the art will conceive of other drawings on the basis of these drawings without creative efforts.

DETAILED DESCRIPTION OF THE INVENTION

In order to make objects, technical solutions and advantages of the present invention more clear, embodiments of the present invention will be described in details hereinafter in conjunction with the accompanying drawings.

An embodiment of the present invention provides a backplate, comprising: a base plate, a projection structure on the base plate, and a first through hole penetrating the base plate and the projection structure.

In case the backplate is bonded with a plastic frame to form a plastic-iron integrated structure, the backplate is placed in a molding chamber, and molten plastic material is injected into the backplate. The plastic material fills the first through hole of the backplate, and covers a surface of the projection structure. When the plastic material is cured at a reduced temperature to form the plastic frame, the plastic frame contacts the surface of the projection structure and an inner wall of the first through hole. The plastic frame is bonded with the backplate to form a plastic-iron integrated structure, so that a tight bonding is developed between the plastic frame and the backplate. At positions where the plastic frame contacts the backplate, the plastic frame can limit the position of the backplate in all directions, the bonding force between the plastic frame and the backplate is enough to ensure a strong bonding between the plastic frame and the backplate. In case the plastic frame is connected with the backplate in a detachable way, due to the projection structure of the backplate, the contact area is increased, so that the plastic frame is connected with the backplate more tightly, and the structural stability and yield of the product are improved.

For example, the base plate is provided with a plurality of projection structures and a plurality of first through holes which accordingly penetrate the base plate and the projection structure. In this way, it is ensured a sufficiently large bonding force between the plastic frame and the backplate, so that the plastic frame will no be separated from the backplate easily.

In the prior art, the plastic frame only contacts a portion of an inner wall of the first through hole (i.e., corresponding to a portion of an inner wall of the base plate). In contrast, in embodiments of the present invention, the backplate comprise a base plate, a projection structure on the base plate, and a first through hole penetrating the base plate and the projection structure. When the backplate is bonded with the plastic frame, the plastic frame not only contacts the inner wall of the first through hole, but also contacts the surface of the projection structure. The contact area is larger than an area of the portion of the inner wall of the base plate to which the first through hole corresponds. Namely, in case the backplate of the present invention is formed into a plastic-iron integrated structure, the contact area between the plastic frame and the backplate is increased, and the bonding force between the plastic frame and the backplate is increased. Even when the plastic material in the plastic frame shrinks in case of fluctuations in temperature and/or humidity, the plastic frame is not easily separated from the backplate, and the stability of the formed plastic-iron integrated structure is improved.

In embodiments of the present invention, the base plate comprises an inner surface and an outer surface, and a groove is arranged inside the base plate for accommodating the injected plastic material for forming the plastic frame. The projection structure can project from the inner surface of the base plate, and extends into the groove. Alternatively, the projection structure can project from the outer surface of the base plate. Alternatively, the projection structure can not only project from the inner surface of the base plate, but also project from the outer surface of the base plate. The present invention is not limited in this aspect.

In particular, in case the projection structure projects from the inner surface of the base plate, the plastic material of the plastic frame fills the first through hole and the groove, so that the surface of the projection structure contacts the plastic frame to form an integrated structure. In case the projection structure projects from the outer surface of the base plate, the plastic material of the plastic frame fills the first through hole and the groove, and the inner surface of the first through hole contacts the plastic frame to form an integrated structure.

Figure 1A:
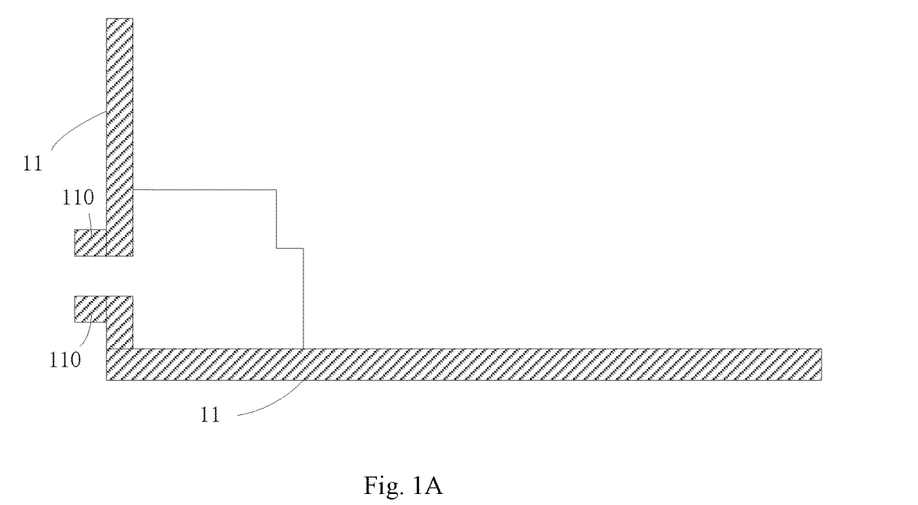
FIG. 1A is a cross-sectional view for illustrating a backplate in an embodiment of the present invention.
Figure 1B:
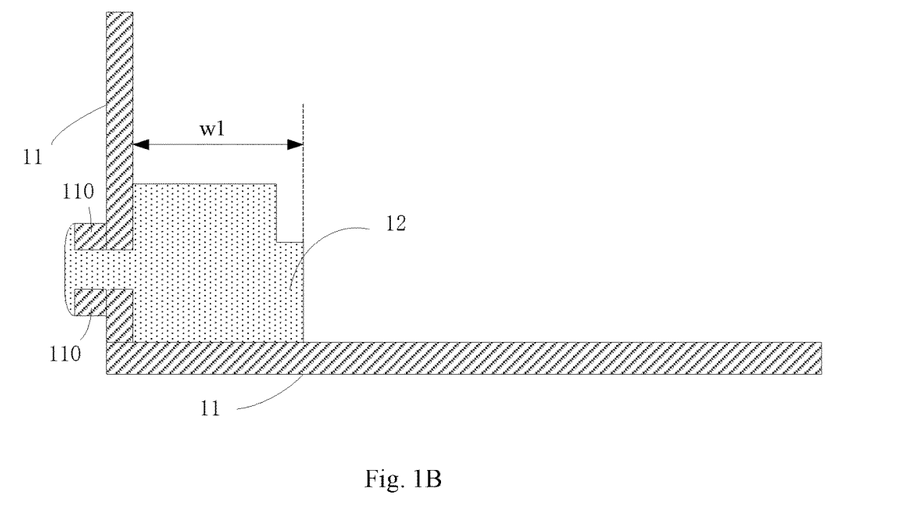
FIG. 1B is a cross-sectional view for illustrating a plastic-iron integrated structure in an embodiment of the present invention.

FIG. 1A is a cross-sectional view for a backplate in an embodiment of the present invention. As shown in FIG. 1A, the backplate comprises a base plate 11, a projection structure 110 projecting from an outer surface of the base plate 11, and a first through hole penetrating the base plate 11 and the projection structure 110. During forming a plastic-iron integrated structure, a plastic material fills the first through hole, so that the formed plastic frame 12 contacts a top surface of the projection structure 110 and an inner wall of the first through hole. The formed plastic-iron integrated structure is shown in FIG. 1B.

Figure 2A:
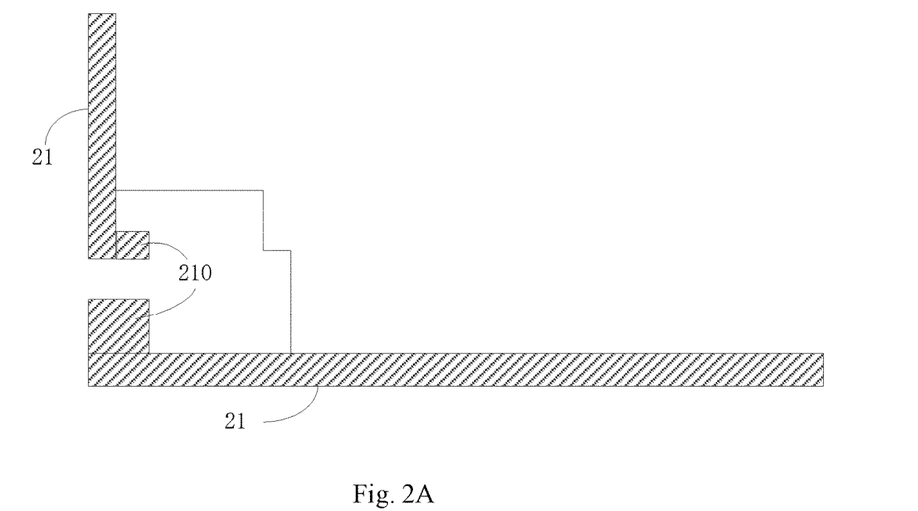
FIG. 2A is a cross-sectional view for illustrating another backplate in an embodiment of the present invention.
Figure 2B:
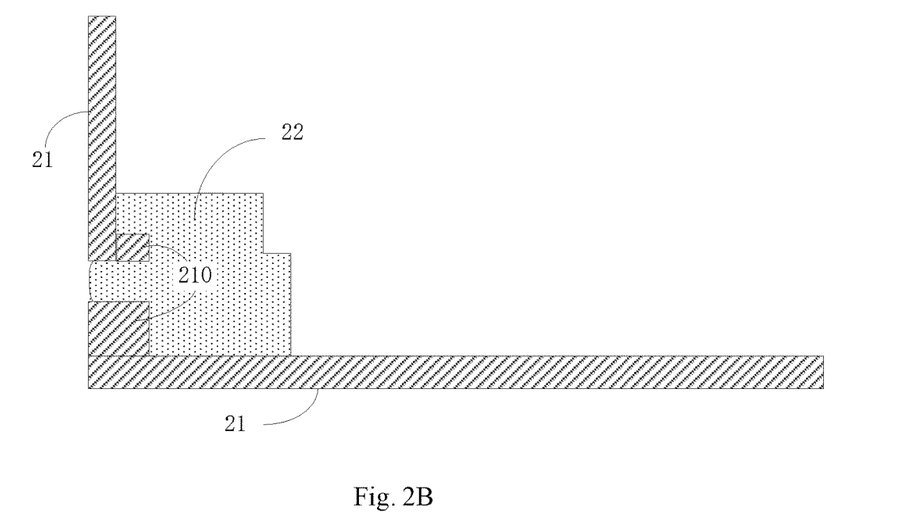
FIG. 2B is a cross-sectional view for illustrating another plastic-iron integrated structure in an embodiment of the present invention.

FIG. 2A is a cross-sectional view for another backplate in an embodiment of the present invention. As shown in FIG. 2A, the backplate comprises a base plate 21, a projection structure 210 projecting from an inner surface of the base plate 21, a first through hole penetrating the base plate 21 and the projection structure 210. During forming a plastic-iron integrated structure, a plastic material fills the first through hole, so that the formed plastic frame 22 contacts a surface of the projection structure 210 and an inner wall of the first through hole. The formed plastic-iron integrated structure is shown in FIG. 2B.

To further increase the bonding force between the plastic frame and the backplate, the projection structure can comprise a bending structure which bends inwards in a radial direction of the first through hole.

As for a through hole, the through hole is symmetric with respect to a central axis, a direction along which the central axis extends is an axial direction of the through hole, and a direction perpendicular to the axial direction is a radial direction of the through hole. The expression "the bending structure bends inwards in the radial direction of the first through hole" indicates the bending structure is bent in such a manner that the bending structure approaches the central axis of the first through hole along the radial direction of the first through hole. A second through hole can be formed in the bending structure. The second through hole communicates with the first through hole, and has an inner diameter smaller than that of the first through hole. The present invention is not limited in term of an inner diameter of the first through hole and an inner diameter of the second through hole.

Figure 3A:
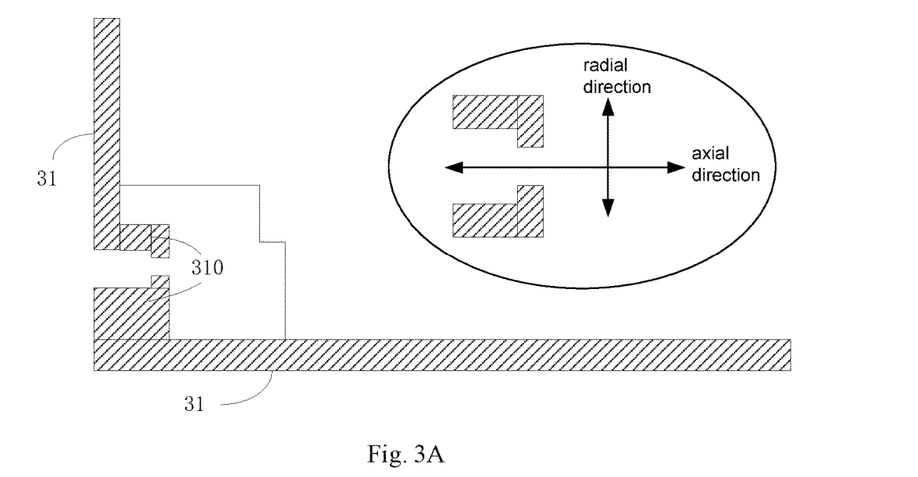
FIG. 3A is a cross-sectional view for illustrating a further backplate in an embodiment of the present invention.
Figure 3B:
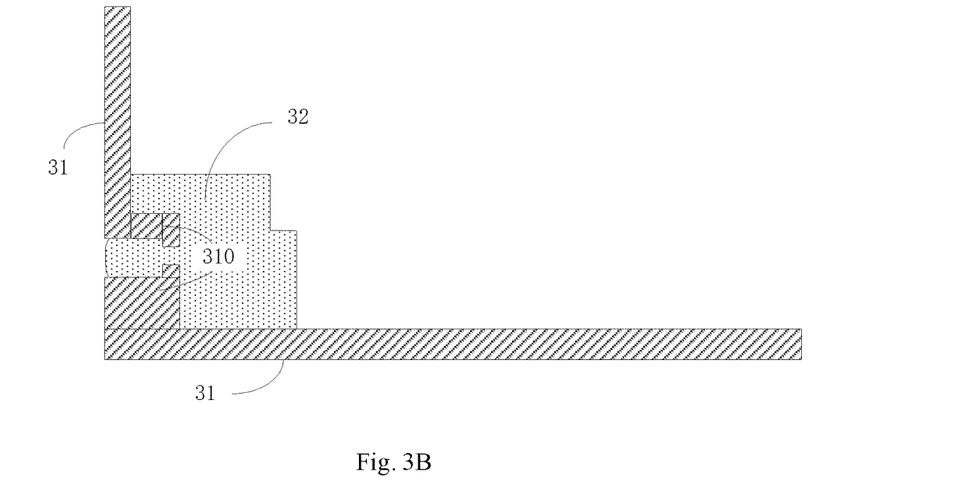
FIG. 3B is a cross-sectional view for illustrating a further plastic-iron integrated structure in an embodiment of the present invention.

FIG. 3A is a cross-sectional view for a further backplate in an embodiment of the present invention. As shown in FIG. 3A, the backplate comprise a base plate 31, a projection structure 310 projecting from an inner surface of the base plate 31, and a first through hole penetrating the base plate 31 and the projection structure 310. The projection structure 310 comprises a bending structure which bends inwards in a radial direction of the first through hole. A second through hole is formed in the bending structure. The second through hole communicates with the first through hole, and has an inner diameter smaller than that of the first through hole. During forming a plastic-iron integrated structure, a plastic material fills the first through hole and second through hole, so that the formed plastic frame 32 contacts a surface of the projection structure 310 and an inner wall of the first through hole. The formed plastic-iron integrated structure is shown in FIG. 3B.

Figure 3C:
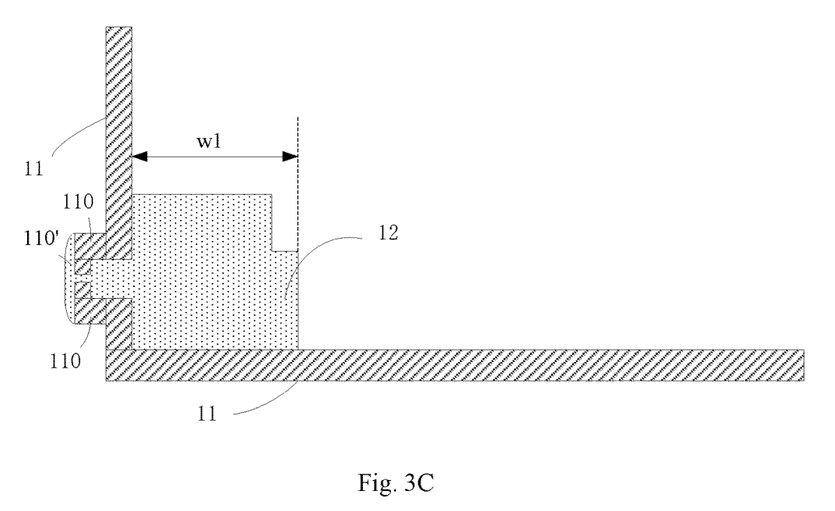
FIG. 3C is a cross-sectional view for illustrating a further plastic-iron integrated structure in an embodiment of the present invention.

A plastic-iron integrated structure in a further embodiment of the present invention is shown in FIG. 3C. The plastic-iron integrated structure differs from the embodiment shown in FIG. 1B in that a distal end of the projection structure 110 comprises a bending structure 110' which bends inwards in a radial direction of the first through hole.

The structures apart from the bending structure in the projection structure are referred to as a designated structure. There is an included angle between the designated structure and the bending structure. For example, the included angle is 90°.

During forming a plastic-iron integrated structure, the plastic frame can fill a space within the included angle between the bending structure and the designated structure, so as to engage with the bending structure. The bonding force between the plastic frame and the backplate is further improved, so that the plastic frame is not separated from the backplate easily.

In embodiments of the present invention, a reflector plate can be arranged on the base plate. An outer surface of the base plate opposite to the reflector plate is referred to as a bottom face of the base plate, and surfaces intersecting the bottom face are side faces of the base plate.

In the prior art, at each through hole, the bonding force between the plastic frame formed in the through hole and the backplate is small. Therefore, to ensure a sufficient bonding force between the whole plastic frame and the whole backplate, through holes are arranged at positions where the bottom face and the bottom face intersect the side faces of the base plate. By arranging the plurality of through holes at different positions, the number of the through holes is increased, for ensuring a sufficient bonding force between the plastic frame and the backplate. However, the bonding force between the plastic frame formed in through holes in the bottom face and the backplate is small, the plastic frame formed in through holes tends to be separated from the backplate. Once the separation occurs, the backplate becomes uneven, and the flatness of optical films on the backplate is affected, so that the optical films are warped. As a result, the display panel may suffer from abnormity in the displayed image, and the display effect is affected.

Figure 4:
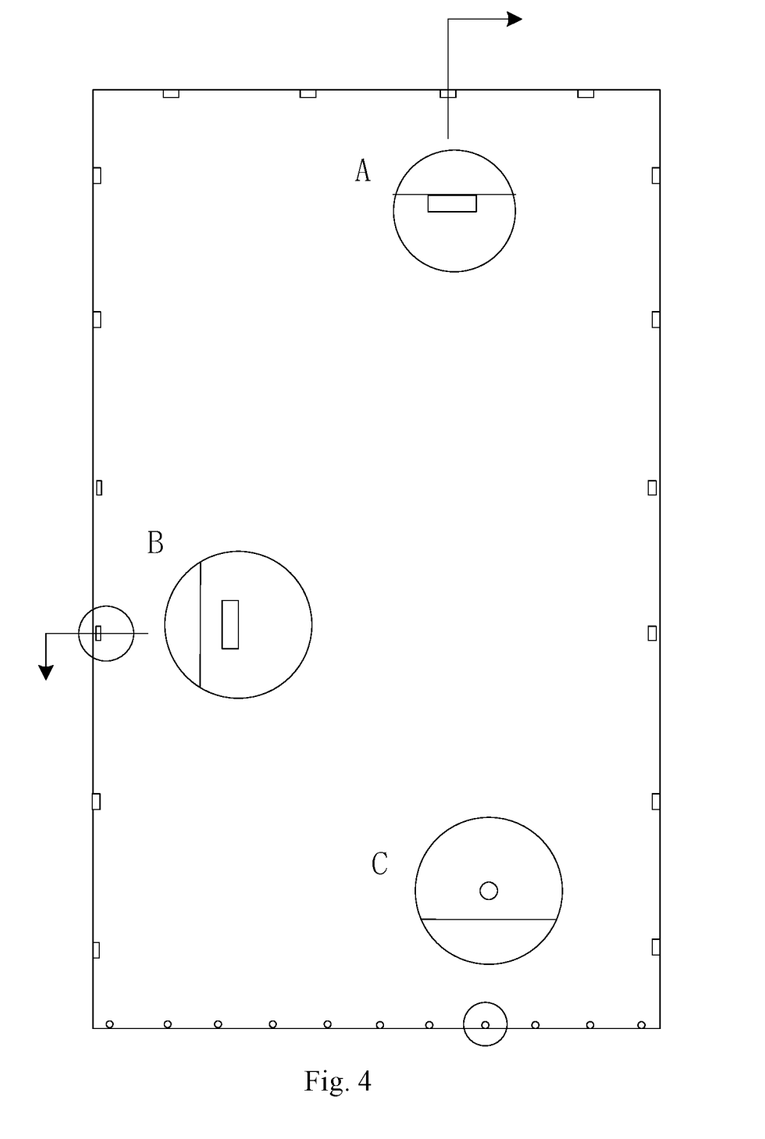
FIG. 4 is a schematic view for illustrating a backplate with a through hole in the prior art.
Figure 5:
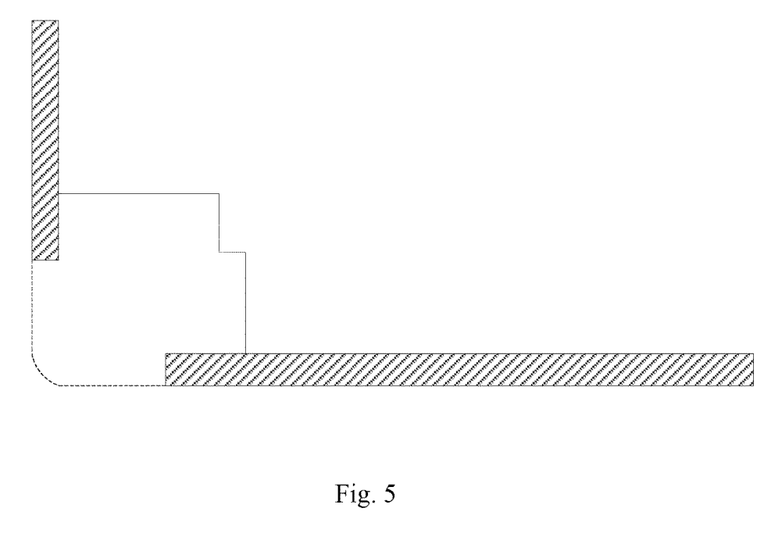
FIG. 5 is a partially cross-sectional view for illustrating a backplate in the prior art.
Figure 6:
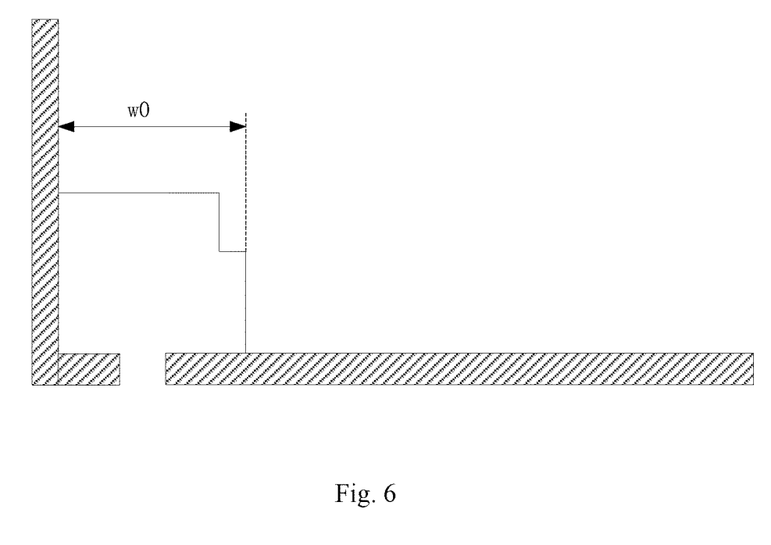
FIG. 6 is another partially cross-sectional view for illustrating a backplate in the prior art.

FIG. 4 is a schematic view for a through hole of a backplate in the prior art. As shown in FIG. 4, through holes of type A are arranged at positions of the backplate where the bottom face intersects the side faces, and through holes of type B and through holes of type C are arranged in the bottom face. Through holes of type B are long strip through holes, and through holes of type C are circular through holes. Through holes of type A have a cross-section shown in FIG. 5. As shown in FIG. 5, through holes of type A are arranged in the backplate at positions where the bottom face intersects the side faces. During forming a plastic-iron integrated structure, the plastic frame contacts an inner wall of through holes of type A. Through holes of type B have a cross-section shown in FIG. 6. As shown in FIG. 6, through holes of type B are arranged in the bottom face of the backplate. During forming a plastic-iron integrated structure, the plastic frame contacts an inner wall of through holes of type B.

The plastic frame in through holes of type B and C tends to be separated from the backplate, the backplate becomes uneven, and the flatness of optical films on the backplate is affected, so that the optical films are warped. As a result, the display panel may suffer from abnormity in the displayed image, and the display effect is affected.

In embodiments of the present invention, the first through hole can be arranged only in the side faces of the backplate. Namely, the first through hole is only arranged in the side faces of the backplate, and no through hole is arranged in the bottom face of the backplate. For example, a plurality of first through holes are arranged in four side faces of the backplate. Further, the plurality of first through holes are uniformly arranged in four side faces of the backplate. The present invention is not limited in term of the positions where the first through hole is arranged in the side faces of the backplate as well as the number of the first through hole.

The first through hole is arranged in the side faces of the backplate, and no through hole is arranged in the bottom face of the backplate. In this way, there is a sufficient bonding force between the plastic frame and the backplate, and the backplate can evenly support the optical films. The flatness of the backlight unit and thus the flatness of the display panel are ensured. The optical films will no be warped, the display panel can display an image normally, and the effect of separation of the plastic frame from the backplate on the display effect is avoided.

In the backplate of the present invention, the plastic frame not only contacts the inner wall of the first through hole, but also contacts the surface of the projection structure, thus increasing the contact area between the plastic frame and the backplate, and increasing the bonding force between the plastic frame and the backplate. Even when the plastic frame shrinks in case of fluctuations in temperature and/or humidity, the plastic frame is not easily separated from the backplate, and the stability of the formed plastic-iron integrated structure is improved. Besides, the first through hole is only arranged in the side faces of the backplate, and the first through hole is not arranged in the bottom face. Thus, there is a sufficient bonding force between the plastic frame and the backplate, the optical films will no be warped, the display panel can display an image normally, and the effect of separation of the plastic frame from the backplate on the display effect is avoided.

All of the above possible technical solutions can be combined in any manner to develop possible embodiments of the present invention, which are not described herein for simplicity.

An embodiment of the present invention further provides a plastic-iron integrated structure, comprising: the backplate in the above embodiments and a plastic frame which is bonded with the backplate. In case the plastic frame is bonded with the backplate, the plastic frame contacts a surface of the projection structure.

In the prior art, the plastic frame in through holes of type B is usually accompanied with burrs, and when the plastic-iron integrated structure vibrates, the burrs easily produce debris. Generally, to prevent burrs and debris, a width of the plastic frame should be increased, so that the plastic frame has a width (w0 in FIG. 6) larger than that of through holes of type B and can cover through holes of type B. Since through holes of type B have a width of about 0.4 mm, if the width of the plastic frame is increased, the frame of the whole backlight unit will be relatively wide, so that a ratio between the frame of the display apparatus and the display screen increases, and the display apparatus will not have a narrow frame.

In embodiments of the present invention, the through hole is not arranged in the bottom face of the backplate, so that burrs or debris will not appear. There is no need to increase the width of the plastic frame, and the width of the plastic frame can be reduced, so that a ratio between the frame of the display apparatus and the display screen is reduced, and the display apparatus will have a narrow frame. As show in FIG. 1B and FIG. 6, the plastic frame of the present invention shown in FIG. 1B has a width w1 smaller than the width w0 of the plastic frame in the prior art shown in FIG. 6.

For example, the plastic frame width can be any value in a range of 0.65 mm-0.95 mm. The plastic frame can have a width of 0.65 mm. Of course, the plastic frame can further have a width of other values, and the present invention embodiment is not limited in this aspect.

In the plastic-iron integrated structure according to an embodiment of the present invention, the plastic frame not only contacts the inner wall of the first through hole, but also contacts the surface of the projection structure, thus increasing the contact area between the plastic frame and the backplate, and increasing the bonding force between the plastic frame and the backplate. Even when the plastic frame shrinks in case of fluctuations in temperature and/or humidity, the plastic frame is not easily separated from the backplate, and the stability of the plastic-iron integrated structure is improved. Besides, the first through hole is only arranged in the side faces of the backplate, and the first through hole is not arranged in the bottom face. Thus, there is a sufficient bonding force between the plastic frame and the backplate, the optical films will no be warped, the display panel can display an image normally, and the effect of separation of the plastic frame from the backplate on the display effect is avoided. By means of the plastic-iron integrated structure of the present invention, the width of the plastic frame can be reduced, so that a ratio between the frame of the display apparatus and the display screen is reduced, and the display apparatus will have a narrow frame.

An embodiment of the present invention further provides a backlight unit, comprising the plastic-iron integrated structure in the above embodiments.

For example, the backlight unit further comprises a backlight source, a light guide, a reflector plate, and optical films. The backlight source is arranged at a light entrance of the light guide, the light guide is arranged on the reflector plate, and the optical films are arranged at a light exit side of the light guide. The backlight unit further comprises a light shielding adhesive tape, which is arranged over the plastic frame to allow for shielding and insulating properties of the plastic frame.

An embodiment of the present invention further provides a display device, comprising the backlight unit in the above embodiments.

For example, the display device further comprises a display panel which is arranged on the backlight unit. Furthermore, the display device can be applied to display apparatuses like mobile phone, TV, and notebook computer, and the present invention embodiment is not limited in this aspect.

For example, the backlight source is a LED (light-emitting diode) backlight source, the backlight unit is a LED backlight unit, and the display device is a LED display device.

The backlight unit and the display device comprise the backplate in the above embodiments. The plastic frame not only contacts the inner wall of the first through hole, but also contacts the surface of the projection structure, thus increasing the contact area between the plastic frame and the backplate, and increasing the bonding force between the plastic frame and the backplate. Even when the plastic frame shrinks in case of fluctuations in temperature and/or humidity, the plastic frame is not easily separated from the backplate, and the stability of the plastic-iron integrated structure is improved. Besides, the first through hole is only arranged in the side faces of the backplate, and the first through hole is not arranged in the bottom face. Thus, there is a sufficient bonding force between the plastic frame and the backplate, the optical films will no be warped, the display panel can display an image normally, and the effect of separation of the plastic frame from the backplate on the display effect is avoided. By means of the technical solution of the present invention, the width of the plastic frame can be reduced, so that a ratio between the frame of the display apparatus and the display screen is reduced, and the display apparatus will have a narrow frame.

Although the present invention has been described above with reference to preferred embodiments, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A support frame for a backlight unit, comprising:
a backplate for a backlight unit; and
a plastic frame which is bonded with the backplate,
wherein the backplate comprises:
   a base plate, wherein the base plate comprises a bottom portion and a side portion extending at an angle from a perimeter of the bottom portion, such that the bottom portion and the side portion form an accommodation space for accommodating backlight components;
   a projection structure on the side portion, wherein the projection structure is directly formed on a surface of the side portion away from the accommodating space; and
a first through hole penetrating the side portion and the projection structure,
   wherein a distal end of the projection structure comprises a bending structure extending from an inner wall of the first through hole in a radial direction of the first through hole, the bending structure forms a distal top surface away from the accommodating space defining a second through hole which communicates with the first through hole, such that the first through hole and the second through hole are co-axial and the second through hole has a diameter smaller than a diameter of the first through hole, and
   wherein the plastic frame forms a first part in the accommodating space covering a surface of bottom portion adjacent the perimeter and a surface of the side portion around the first through hole and an anchoring part extending away from the accommodating space through the first through hole and the second through hole and covering the distal top surface of the projection structure.

2. The support frame for a backlight unit of claim 1, wherein the plastic frame is formed by injecting molten plastic material into the backplate.

3. The support frame for a backlight unit of claim 1, wherein the first through hole and the second through hole each have a circular cross section.

4. The support frame for a backlight unit of claim 1, wherein at least a portion of the projection structure is either formed on the base plate forming an integral piece or is formed integrally by the base plate.

5. The support frame for a backlight unit of claim 1, wherein the first part of the plastic frame from the surface of the side portion has a width parallel to the surface of the bottom portion of 0.65 mm-0.95 mm.

6. The support frame for a backlight unit of claim 1, wherein the base plate is iron.

7. The support frame for a backlight unit of claim 1, wherein the plastic frame is rubber.

8. A backlight unit, wherein the backlight unit comprises the support frame for a backlight unit of claim 1.

9. A display device, wherein the display device comprises the backlight unit of claim 8.

* * * * *